(12) United States Patent
Wang et al.

(10) Patent No.: US 11,009,360 B2
(45) Date of Patent: May 18, 2021

(54) METHOD, APPARATUS AND STORAGE MEDIUM FOR DETERMINING NAVIGATION REFERENCE POINT, NAVIGATION METHOD, APPARATUS AND STORAGE MEDIUM

(71) Applicant: BAIDU ONLINE NETWORK TECHNOLOGY (BEIJING) CO., LTD., Beijing (CN)

(72) Inventors: Yang Wang, Beijing (CN); Xin Zhang, Beijing (CN)

(73) Assignee: BAIDU ONLINE NETWORK TECHNOLOGY CO., LTD., Beijing (CN)

(*) Notice: Subject to any disclaimer, the term of this patent is extended or adjusted under 35 U.S.C. 154(b) by 227 days.

(21) Appl. No.: 16/147,323

(22) Filed: Sep. 28, 2018

(65) Prior Publication Data

US 2019/0033087 A1    Jan. 31, 2019

Related U.S. Application Data

(63) Continuation of application No. PCT/CN2016/096106, filed on Aug. 19, 2016.

(30) Foreign Application Priority Data

Mar. 31, 2016   (CN) .......................... 201610202210.8

(51) Int. Cl.
    *G01C 21/34*    (2006.01)
    *G01C 21/36*    (2006.01)
(52) U.S. Cl.
    CPC ..... *G01C 21/3476* (2013.01); *G01C 21/3644* (2013.01); *G01C 21/3667* (2013.01)

(58) Field of Classification Search
    CPC ............ G01C 21/3476; G01C 21/3644; G01C 21/3667
    (Continued)

(56) References Cited

U.S. PATENT DOCUMENTS 6,067,499 A * 5/2000 Yagyu ................... G01C 21/34
                                                      701/423
6,321,158 B1 * 11/2001 DeLorme ............... G01C 21/26
                                                      340/995.16
(Continued)

FOREIGN PATENT DOCUMENTS

CN       101776459 A    7/2010
CN       101776459 A    7/2010
(Continued)

OTHER PUBLICATIONS

International Search Report for PCT/CN2016/096106, dated Jan. 6, 2017.
2500 pieces of geography knowledge you must know.

*Primary Examiner* — Yazan A Soofi
(74) *Attorney, Agent, or Firm* — von Briesen & Roper, s.c.

(57) ABSTRACT

A method, apparatus and storage medium for determining a navigation reference point, a navigation method, apparatus and storage medium. The method includes: determining a navigation route according to origin position information and destination position information sent by a navigation terminal (S110); determining a search area corresponding to the origin position information according to the origin position information (S120); acquiring, in the search area, a target building as a reference point indicating a forward direction for a user of the navigation terminal after navigation starts, according to a defined building selecting rule (S130); and pushing the navigation route and the target building to the navigation terminal (S140). According to the (Continued)

technical solution, the existing route navigation techniques is optimized, thereby satisfying growing navigation demands of people for facilitation and individuation.

18 Claims, 7 Drawing Sheets

(58) Field of Classification Search
USPC .......................................................... 701/426
See application file for complete search history.

(56) References Cited

U.S. PATENT DOCUMENTS

| | | | |
|---|---|---|---|
| 8,219,316 B2* | 7/2012 | Goel | G01C 21/3484 |
| | | | 701/422 |
| 8,954,266 B2* | 2/2015 | Ofek | G01C 21/3484 |
| | | | 701/424 |
| 10,733,677 B2* | 8/2020 | Podgorny | G06F 16/3322 |
| 2004/0139049 A1* | 7/2004 | Hancock | H04L 29/12009 |
| 2006/0111834 A1* | 5/2006 | Bouget | G08G 1/096827 |
| | | | 701/533 |
| 2009/0150349 A1* | 6/2009 | Cartin | G06F 16/29 |
| 2009/0265340 A1 | 10/2009 | Barcklay et al. | |
| 2013/0103311 A1* | 4/2013 | Yanase | G01C 21/3676 |
| | | | 701/527 |
| 2015/0350409 A1* | 12/2015 | Tuukkanen | H04M 1/72572 |
| | | | 455/456.2 |
| 2015/0362988 A1* | 12/2015 | Yamamoto | G06F 3/011 |
| | | | 345/156 |

FOREIGN PATENT DOCUMENTS

| | | |
|---|---|---|
| CN | 102265114 A | 11/2011 |
| CN | 102645228 A | 8/2012 |
| CN | 102645228 A | 8/2012 |
| CN | 102869953 A | 1/2013 |
| CN | 103017778 A | 4/2013 |
| CN | 103017778 A | 4/2013 |
| CN | 103364003 A | 10/2013 |
| CN | 103376117 A | 10/2013 |
| CN | 103376117 A | 10/2013 |
| CN | 104931064 A | 9/2015 |
| CN | 104931065 A | 9/2015 |
| EP | 1650533 A1 | 4/2006 |
| JP | H11-51666 | 2/1999 |
| JP | 2005121596 A | 5/2005 |
| JP | 2007-212437 | 8/2007 |
| JP | 2012-008210 | 1/2012 |
| JP | 2014-160032 | 9/2014 |
| KR | 1020150027620 A | 3/2015 |

* cited by examiner

METHOD, APPARATUS AND STORAGE MEDIUM FOR DETERMINING NAVIGATION REFERENCE POINT, NAVIGATION METHOD, APPARATUS AND STORAGE MEDIUM

CROSS-REFERENCE TO RELATED APPLICATIONS

This application is a continuation of International Application PCT/CN2016/096106, with an international filing date of Aug. 19, 2016, which claims priority to Chinese Patent Application no. 201610202210.8, filed with the China National Intellectual Property Administration (CNIPA) on Mar. 31, 2016, the contents of which are incorporated herein by reference in their entirety.

TECHNICAL FIELD

The present disclosure relates to the field of information processing, and specifically to a method, apparatus and storage medium for determining a navigation reference point, a navigation method, apparatus and storage medium.

BACKGROUND

As GPS (Global Positioning System) becomes more popular, more and more consumers instantly acquire route plan information through smart terminals while driving or walking. The basic flow of the existing route navigation is as follows: a user opens a client navigation software installed on the smart terminal, inputs an origin position and a destination position, and sends the positions to a corresponding navigation server. The navigation server generates a navigation route according to origin and destination position information and returned it back to the client software, and the client software directs the driving or walking of the user according to the navigation route.

In a driving navigation scenario, especially in walking navigation and cycling navigation scenarios, when starting the navigation, the user often faces many direction choices, forward, backward, left and right. In a use scenario during the beginning of the navigation, existing navigation products merely indicates to the user with "start navigation" instead of a clear guidance for a direction. As a result, users having a poor sense of direction cannot immediately select a correct direction, and they move onto a correct guided route only after many tries.

SUMMARY

Embodiments of the present disclosure provide a method, apparatus and storage medium for determining a navigation reference point, a navigation method, apparatus and storage medium, to optimize the existing route navigation techniques to meet the growing navigation demands of people for facilitation and individuation.

In a first aspect, the embodiments of the present disclosure provide a method for determining a navigation reference point, comprising:

determining a navigation route according to origin position information and destination position information sent by a navigation terminal;

determining a search area corresponding to the origin position information according to the origin position information;

acquiring, in the search area, a target building as a reference point indicating a forward direction for a user of the navigation terminal after navigation starts, according to a defined building selecting rule; and pushing the navigation route and the target building to the navigation terminal.

In a second aspect, the embodiments of the present disclosure further provide a navigation method, comprising:

sending origin position information and destination position information to a navigation server;

receiving a navigation route and target building returned by the navigation server;

determining a theoretical forward direction of a user according to the navigation route; and prompting the user for navigation using the target building as a reference point indicating a forward direction for the user after the navigation starts according to a positional relation between the theoretical forward direction and the target building, at the beginning of the prompting for the navigation.

In a third aspect, the embodiments of the present disclosure further provide an apparatus for determining a navigation reference point, comprising:

a route determining module, configured to determine a navigation route according to origin position information and destination position information sent by a navigation terminal;

an area determining module, configured to determine a search area corresponding to the origin position information according to the origin position information;

a reference point determining module, configured to acquire, in the search area, a target building as a reference point indicating a forward direction for a user of the navigation terminal after navigation starts, according to a defined building selecting rule; and a pushing module, configured to push the navigation route and the target building to the navigation terminal.

In a fourth aspect, the embodiments of the present disclosure further provide a navigation apparatus, comprising:

a sending module, configured to send origin position information and destination position information to a navigation server;

a receiving module, configured to receive a navigation route and target building returned by the navigation server;

a direction determining module, configured to determine a theoretical forward direction of a user according to the navigation route; and a prompting module, configured to prompt the user for navigation using the target building as a reference point indicating a forward direction for the user after the navigation starts according to a positional relation between the theoretical forward direction and the target building, at the beginning of the prompting for the navigation.

In a fifth aspect, the embodiments of the present disclosure further provide one or more storage media storing computer executable instructions, the computer executable instructions, when executed by a computer processor, performing a method for determining a navigation reference point, comprising:

determining a navigation route according to origin position information and destination position information sent by a navigation terminal;

determining a search area corresponding to the origin position information according to the origin position information;

acquiring, in the search area, a target building as a reference point indicating a forward direction for a user of the navigation terminal after navigation starts, according to a defined building selecting rule; and pushing the navigation route and the target building to the navigation terminal.

In a sixth aspect, the embodiments of the present disclosure further provide one or more storage media storing computer executable instructions, the computer executable instructions, when executed by a computer processor, performing a navigation method, comprising:

sending origin position information and destination position information to a navigation server;

receiving a navigation route and target building returned by the navigation server;

determining a theoretical forward direction of a user according to the navigation route; and.

prompting the user for navigation using the target building as a reference point indicating a forward direction for the user after the navigation starts according to a positional relation between the theoretical forward direction and the target building, at the beginning of the prompting for the navigation.

According to the method, apparatus and storage medium for determining a navigation reference point, the navigation method, apparatus and storage medium provided by the embodiments of the present disclosure, a navigation server acquires, in a search area determined by origin position information sent by a navigation terminal, a target building as a reference point indicating a forward direction for a user of the navigation terminal after navigation starts, and provides the target building and a navigation route to the navigation terminal, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

BRIEF DESCRIPTION OF THE DRAWINGS

To describe the technical solutions in the embodiments of the present disclosure more clearly, the drawings that need to be used in the embodiments are briefly introduced. Clearly, the drawings in the following description are merely some embodiments of the present disclosure, and those of ordinary skill in the art may further make modifications and replacements to these drawings without creative efforts.

DETAILED DESCRIPTION OF EMBODIMENTS

The technical solutions in the embodiments of the present disclosure are described clearly and completely below with reference to the accompanying drawings. Evidently, the described embodiments are only some rather than all embodiments of the present disclosure, and are used for explaining the principle of the present disclosure, but are not intended to limit the present disclosure. On the basis of the embodiments in the present disclosure, all other embodiments acquired by those of ordinary skill in the art without creative efforts shall belong to the protection scope of the present disclosure.

The First Embodiment

Figure 1:
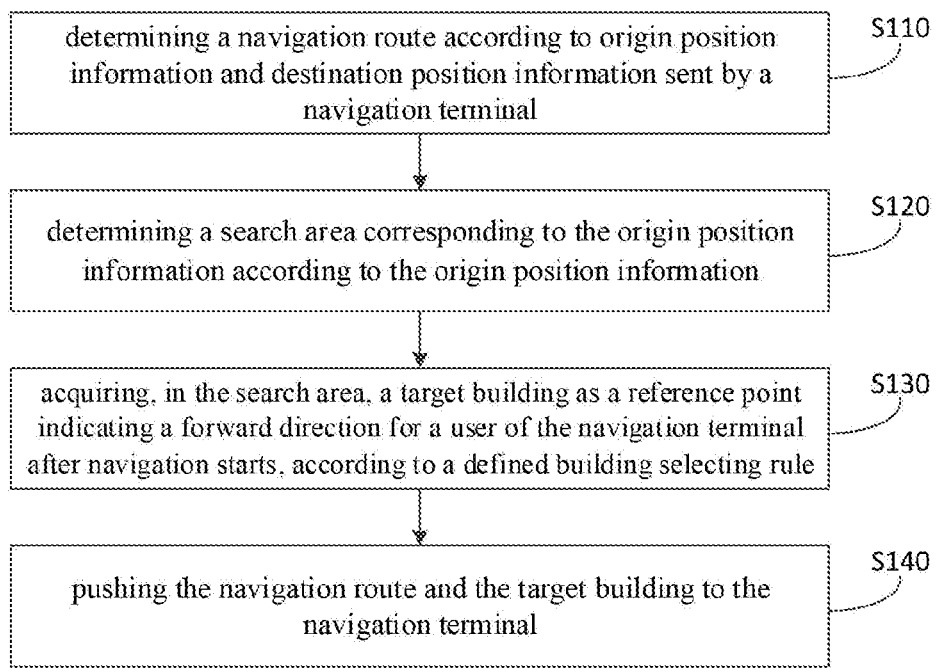
FIG. 1 is a flowchart of a method for determining a navigation reference point according to the first embodiment of the present disclosure.

FIG. 1 is a flowchart of a method for determining a navigation reference point according to the first embodiment of the present disclosure. The method of the embodiment may be generally suitable for a situation where a navigation server confirms a forward direction of a navigation route by selecting a reference point near a position of a navigation origin. The method of this embodiment may be performed by an apparatus for determining a navigation reference point, and this apparatus may be implemented by means of software and/or hardware and may be generally integrated into a navigation server. Referring to FIG. 1, the method for determining a navigation reference point provided by the embodiment includes the following steps.

S110, determining a navigation route according to origin position information and destination position information sent by a navigation terminal.

In this embodiment, the navigation terminal is a terminal device possessing a GPS module and navigation type client software, such as a cell phone, a navigator.

Illustratively, after confirming the origin position information and destination position information sent by the navigation terminal, the navigation server may plan an appropriate navigation route according to the above position information, real-time traffic information, specific requirement information sent by the navigation terminal, etc.

The specific requirement information sent by the navigation terminal may include a route taking a shortest time, a route having a shortest mileage, or a route passing by a specific section, etc. among a plurality of routes.

S120, determining a search area corresponding to the origin position information according to the origin position information.

The search area includes at least one building which name is clearly recorded in a database of the navigation server. The building may be a tall building, a shop, or other buildings that can be displayed on a map of the navigation terminal, for example, sightseeing towers, land marks.

Illustratively, the search area may be an area determined by the navigation server according to the origin position information. For instance, an area determined with the received origin position information as a center of a circle and a set mileage as a radius by the navigation server is the search area.

Further, for the same origin position information, a search area determined by the navigation server each time may be the same. Alternatively, the navigation server may record a correlation between the origin position information and the search area when confirming the search area corresponding to the origin position information at the first time. When subsequently receiving the origin position information, the navigation server can confirm the corresponding search area only according to the corresponding correlation.

Alternatively, the search area may be defined by the navigation server according to the origin position information and a start direction of the navigation route. At this time, the search area covers routes within a certain number of mileages that is counted from the origin of the navigation route.

Further, for the same origin position information, since the start direction of the navigation route planned by the navigation server each time may be different, the search area determined each time may be different. The navigation server may record the correlation between the navigation route and the search area, and the corresponding search area can be directly determined when the navigation server plans this navigation route again.

It should be noted that any limitations are not made to a shape of the search area.

S130, acquiring, in the search area, a target building as a reference point indicating a forward direction for a user of the navigation terminal after navigation starts, according to a defined building selecting rule.

Illustratively, after determining the search area, the navigation server selects the target building in the search area according to the defined building selecting rule, and uses the selected target building as the reference point for indicating the forward direction for the user of the navigation terminal after the navigation starts.

The target building may be a building that has a clear name in the database of the navigation server and meets the building selecting rule. The target building possesses characteristics of easily recognizing, high popularity and uniqueness, and may be a tall building, a shop or a landmark, etc., for example, "World Financial Center", "XX Restaurant", "XX Hotel" or "XX Tower". Alternatively, the target building is a building that can form a reference point with the start direction of the navigation route. For instance, the target building is at a position having an identical direction to the start direction of the navigation route, or the target building is at a position having an opposite direction to the start direction of the navigation route.

Further, the building selecting rule may be set according to actual requirements. For example, the navigation server selects a building that is unique in the search area as the target building. In another example, the navigation server selects a highest building in the search area as the target building.

Alternatively, after determining the target building, the navigation server may record a correlation between the navigation route and the target building, and may also record the correlation between the search area and the target building, or record a correlation between the origin position information and the target building. The advantage of this is that the navigation server can directly confirm the target building according to the correlation when receiving the above corresponding information.

Typically, map data in the navigation server will be updated in real time or periodically to ensure the coincidence with the actual traffic information. Therefore, there could be a situation where in the updated map data, the recorded navigation route, origin position information or target building corresponding to the search area does not satisfy the uniqueness. At this point, a new target building may be selected again in the corresponding search area according to the defined building selecting rule, or a search area may be determined again and a new target building is selected according to the defined building selecting rule.

S140, pushing the navigation route and the target building to the navigation terminal.

Illustratively, the navigation server pushes the navigation route and the corresponding target building to the navigation terminal after determining the navigation route and the target building. Alternatively, the navigation server sends position information and name information of the target building to the navigation terminal.

Further, after receiving the navigation route, the navigation terminal may determine a theoretical forward direction (i.e., a start direction of the navigation) of the user according to the position of the navigation route in the map. Then, the navigation terminal determines the positional relationship between the target building and the theoretical forward direction. For instance, the navigation terminal may determine that the target building may be passed by in the theoretical forward direction, or the navigation terminal may determine that the target building is in a direction opposite to the theoretical forward direction. At this point, the navigation terminal may use the target building as the reference point indicating the forward direction for the user after the navigation starts according to the positional relation, and prompt the user for the navigation.

For instance, after determining the navigation route, the navigation server determines the XX building as the target building and sends the navigation route and the name and position information of the XX building to the navigation terminal. After receiving the above data, the navigation terminal determines that the XX building is in the direction opposite to the theoretical forward direction of the navigation route. At this point, the navigation terminal may prompt the user to "drive along the direction opposite to the XX building" when starting the navigation. If the XX building is on the way along the theoretical forward direction, the navigation terminal may prompt the user to "drive along the direction of the XX Building" when starting the navigation.

Alternatively, the navigation terminal highlights the target building in the navigation map when starting the navigation, so that the user recognizes a correct direction according to the highlighted target building.

According to the method for determining a navigation reference point provided by the first embodiment of the present disclosure, a navigation server acquires, in a search area determined by origin position information sent by a navigation terminal, a target building as a reference point indicating a forward direction for a user of the navigation terminal after navigation starts, and provides the target building and a navigation route to the navigation terminal, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

Figure 2:
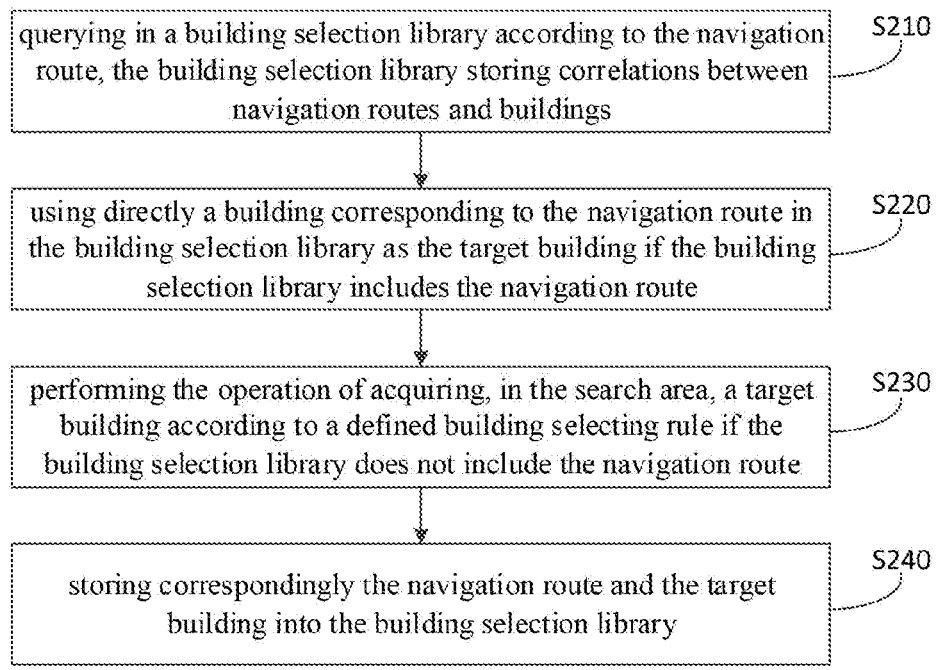
FIG. 2 is a flowchart of a method determining a target building according to the first embodiment of the present disclosure.

On the basis of the above embodiment, referring to FIG. 2, before the target building is acquired in the search area according to the defined building selecting rule, alternatively, the method may further include the following steps.

S210, querying in a building selection library according to the navigation route, where the building selection library stores correlations between navigation routes and buildings.

Illustratively, the database of the navigation server may include the building selection library, and the building selection library may store the correlation between the navigation route and the building.

Further, after determining the navigation route according to the origin position information and the destination position information, the navigation server searches the building selection library for the navigation route and the correlation between the navigation route and the building. Each navigation route corresponds to a building, and the building is unique.

S220, using directly a building corresponding to the navigation route in the building selection library as the target building if the building selection library includes the navigation route.

Illustratively, if the navigation server finds the navigation route in the building selection library, the building corresponding to the navigation route is acquired, and the building is used as the target building, so that the navigation terminal determines the forward direction for the user after the navigation starts.

In this embodiment, the navigation server may directly select the target building corresponding to the navigation route from the building selection library, which may speed up the determination for the target building while reducing workloads of the navigation server.

S230, performing the operation of acquiring, in the search area, a target building according to a defined building selecting rule if the building selection library does not include the navigation route.

Illustratively, if the navigation server fails to find the navigation route in the building selection library, the navigation route may be a navigation route planned by the navigation server at the first time. At this point, in the determined search area the navigation server may acquire the target building according to the defined building selecting rule, so that the navigation terminal determines, according to the target building, the forward direction for the user after the navigation starts.

It should be noted that S210-S230 may also be performed before the step "determining a search area corresponding to the origin position information according to the origin position information". At this point, if the building selection library does not include the navigation route determined by the navigation server, the operation of determining a search area corresponding to the origin position information according to the origin position information is performed, and the target building is acquired in the search area according to the defined building selecting rule.

Alternatively, after the operation of acquiring, in the search area, a target building, the method may further include:

S240, storing correspondingly the navigation route and the target building into the building selection library.

Further, after planning the navigation route again, the navigation server may find the navigation route in the building selection library to determine the corresponding target building, so that the navigation terminal determines, according to the target building, the forward direction for the user after the navigation starts.

The Second Embodiment

Figure 3:
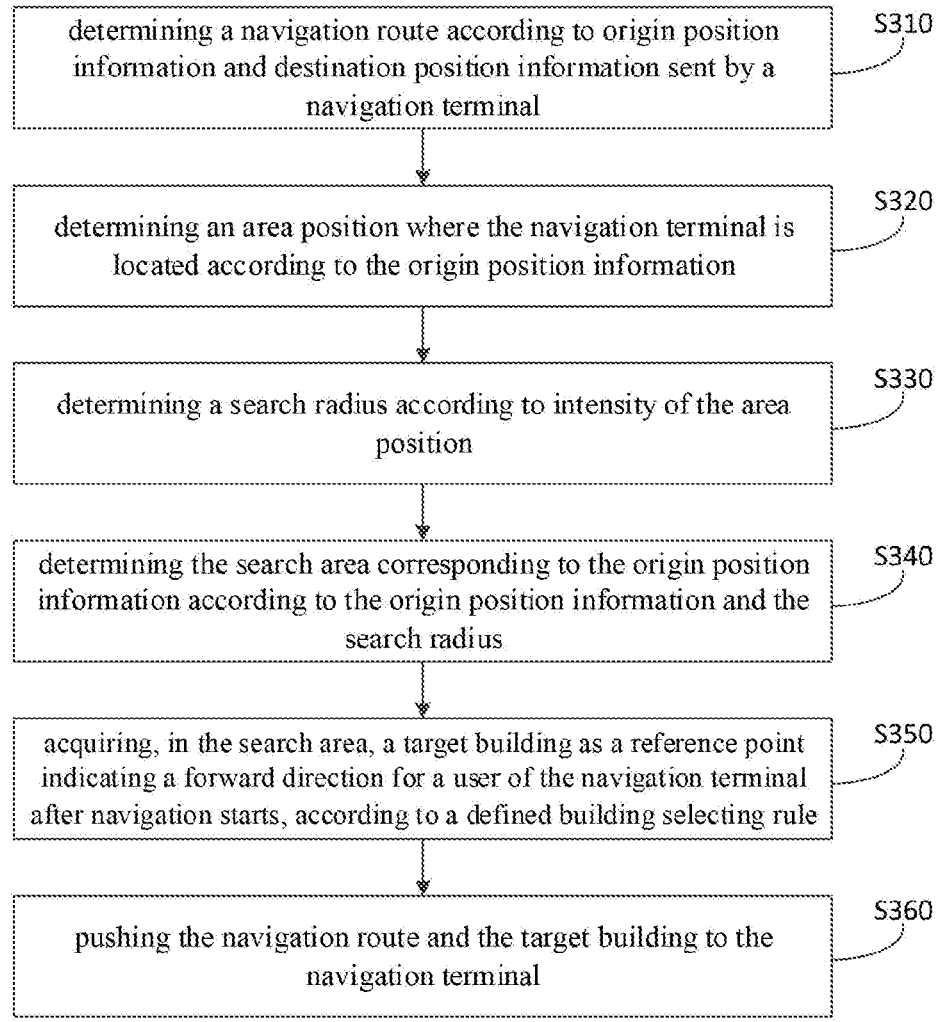
FIG. 3 is a flowchart of a method for determining a navigation reference point according to the second embodiment of the present disclosure.

FIG. 3 is a flowchart of a method for determining a navigation reference point according to the second embodiment of the present disclosure, and this embodiment is optimized on the basis of the above-mentioned embodiment. In this embodiment, the operation of determining a search area corresponding to the origin position information according to the origin position information is optimized to include: determining an area position where the navigation terminal is located according to the origin position information; determining a search radius according to intensity of the area position; and determining the search area corresponding to the origin position information according to the origin position information and the search radius. Referring to FIG. 3, the method of this embodiment includes the following steps.

S310, determining a navigation route according to origin position information and destination position information sent by a navigation terminal.

S320, determining an area position where the navigation terminal is located according to the origin position information.

In this embodiment, the area position may be a commercial area or an administrative area, etc., or may be a street, or an intersection, etc.

Illustratively, according to origin position information, the navigation server determines that the origin position information is in XX commercial area. In another example, according to origin position information, it is determined that the origin position information is in XX street.

S330, determining a search radius according to intensity of the area position.

In this embodiment, a specific statistical approach of the intensity may be set by the navigation server itself. The intensity may indicate a density of buildings near the area position that is recorded in a database of the navigation server.

Further, the search radius may be determined according to the intensity. When the intensity of the area position is high, it indicates that a density of buildings in the area position is high, and a complexity of selecting a target building will increase if the navigation server determines a larger search radius. Therefore, at this time, the navigation server will determine a smaller search radius. For instance, when the area position is in the XX commercial area, a number of buildings within the commercial area recorded in the navigation server is large, and at this time, the navigation server will determine the search radius as 0.5 km.

Correspondingly, when the intensity of the area position is low, it indicates that the density of the buildings in the area position is low, and at this time, the navigation server will determine a larger search radius. For instance, when the area position is in a suburb, a number of buildings near the area position recorded in the navigation server is small, and at this time, the navigation server will determine the search radius as 1.5 km.

S340, determining the search area corresponding to the origin position information according to the origin position information and the search radius.

A mileage of the search radius is directly proportional to an area of the search area.

Further, according to the search radius, the search area may be a circular area determined by the navigation server with the origin position information as a center of a circle. The search area may also be a semicircular area that is determined with the origin position information as the center of the circle, along the start direction of the navigation route and according to the search radius by the navigation server.

S350, acquiring, in the search area, a target building as a reference point indicating a forward direction for a user of the navigation terminal after navigation starts, according to a defined building selecting rule.

S360, pushing the navigation route and the target building to the navigation terminal.

According to the method for determining a navigation reference point provided by the second embodiment of the present disclosure, a navigation server acquires, in a search area determined by origin position information sent by a navigation terminal, a target building as a reference point indicating a forward direction for a user of the navigation terminal after navigation starts, and provides the target building and a navigation route to the navigation terminal, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

The Third Embodiment

Figure 4:
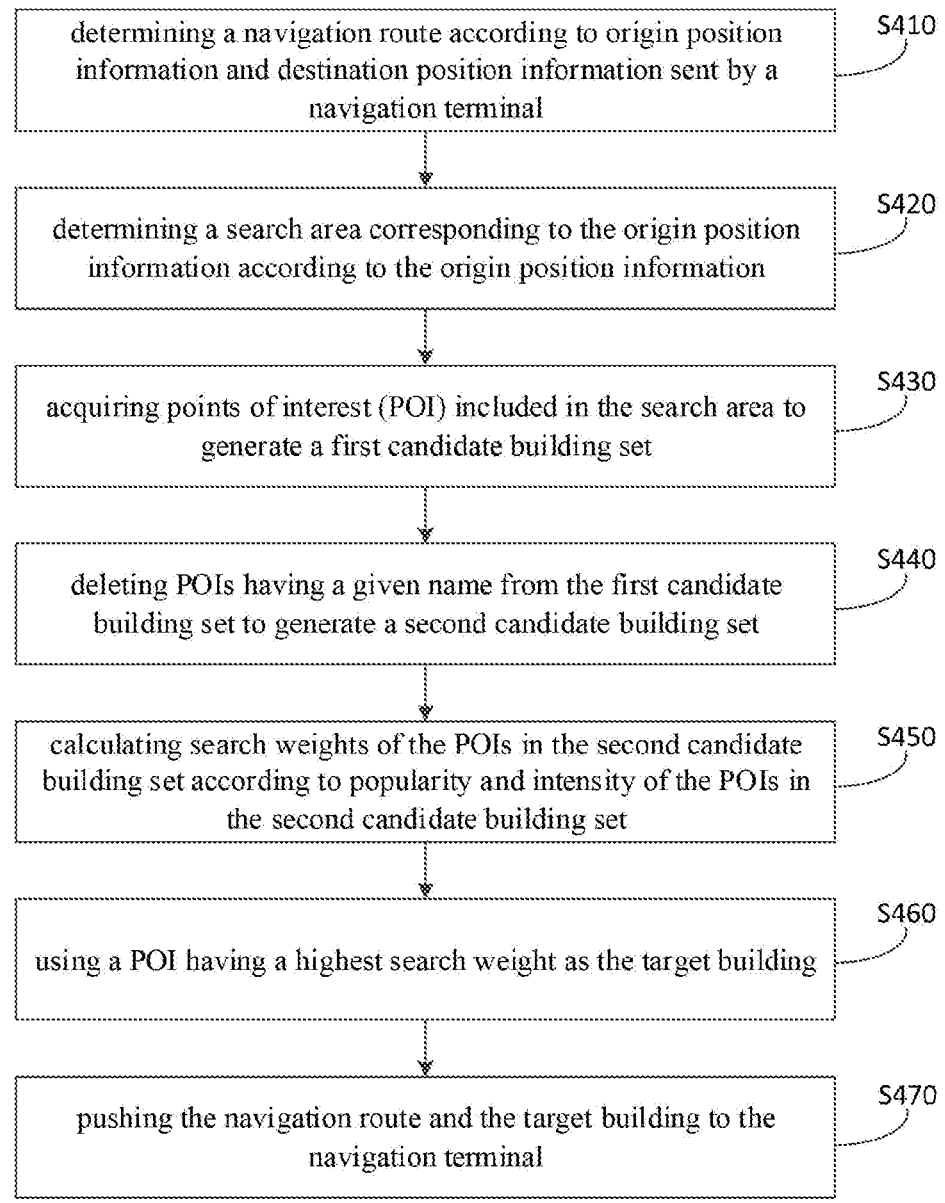
FIG. 4 is a flowchart of a method for determining a navigation reference point according to the third embodiment of the present disclosure.

FIG. 4 is a flowchart of a method for determining a navigation reference point according to the third embodiment of the present disclosure and this embodiment is optimized on the basis of the above-mentioned embodiments. In this embodiment, the operation of acquiring, in the search area, a target building according to a defined building selecting rule is optimized to include: acquiring points of interest (POI) included in the search area to generate a first candidate building set; deleting POIs having a given name from the first candidate building set to generate a second candidate building set; calculating search weights of the POIs in the second candidate building set according to popularity and intensity of the POIs in the second candidate building set; and using a POI having a highest search weight as the target building. Referring to FIG. 4, the method of this embodiment includes the following steps.

S410, determining a navigation route according to origin position information and destination position information sent by a navigation terminal.

S420, determining a search area corresponding to the origin position information according to the origin position information.

S430, acquiring points of interest (POI) included in the search area to generate a first candidate building set.

In this embodiment, the POIs may include at least one of: catering, entertainment, accommodation, a hospital, shopping, an office building or a gas station, etc. The POIs may also include names corresponding to buildings. When each piece of information of the buildings is stored into a database of the navigation server, corresponding POIs will generally be stored into the database.

Further, the navigation server acquires all the buildings with POIs in the search area to generate the first candidate building set.

S440, deleting POIs having a given name from the first candidate building set to generate a second candidate building set.

Illustratively, the first candidate building set generated by the navigation server may include buildings having the same name. These buildings do not satisfy the uniqueness of the target building. Therefore, the navigation server will delete such buildings from the first candidate building set to generate the second candidate building set including buildings having different names. The buildings in the second candidate building set satisfy the uniqueness.

For instance, there are three XX restaurants having the same name in the POIs of the first candidate building set. At this point, the navigation server will delete all the recorded XX restaurants from the first candidate building set.

S450, calculating search weights of the POIs in the second candidate building set according to popularity and intensity of the POIs in the second candidate building set.

Illustratively, the navigation server will count the popularity of the POIs recorded in the database in real time or periodically. No limitation is made to a specific popularity counting rule. For instance, a number of occurrences of the same POI may be used as a basis of counting the popularity.

Correspondingly, the navigation server will count the intensity of the POIs recorded in the database in real time or periodically. No limitation is made to a specific intensity counting rule. For example, data regarding a flow rate of people of a POI may be used as a basis of counting the intensity. In another example, a number of searches for the POI may be used as a basis of counting the intensity.

Further, the navigation server determines the popularity and intensity of each POI in the second candidate building set and calculates a search weight of the corresponding POI according to the popularity and intensity.

Alternatively, the search weight of each POI in the second candidate building set may be calculated according to the following formula: $w=\alpha*P+\beta*I$. P is the popularity of POI, I is the intensity of POI, and $\alpha$ and $\beta$ are defined ratio coefficients. Specific values of $\alpha$ and $\beta$ may be set by the navigation server according to actual situations.

S460, using a POI having a highest search weight as the target building.

Further, the navigation server calculates the search weight of each POI in the second candidate building set, and uses the POI having the highest calculating result as the target building. The highest search weight may indicate that the POI has high popularity and is easily recognized, which helps the user to use that as a reference point of a start direction of the navigation.

S470, pushing the navigation route and the target building to the navigation terminal.

According to the method for determining a navigation reference point provided by the third embodiment of the present disclosure, a navigation server acquires, in a search area determined by origin position information sent by a navigation terminal, a target building as a reference point indicating a forward direction for a user of the navigation terminal after navigation starts, and provides the target building and a navigation route to the navigation terminal, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

The Fourth Embodiment

Figure 5:
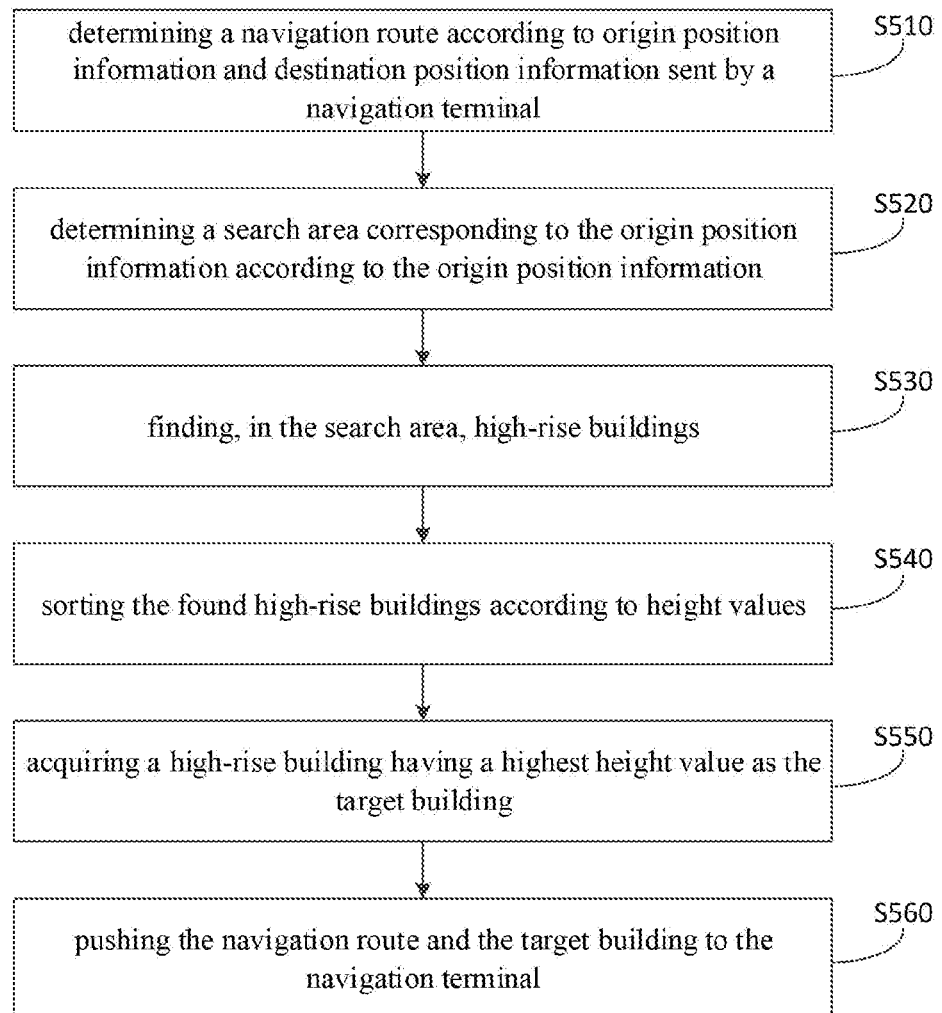
FIG. 5 is a flowchart of a method for determining a navigation reference point according to the fourth embodiment of the present disclosure.

FIG. 5 is a flowchart of a method for determining a navigation reference point according to the fourth embodiment of the present disclosure and this embodiment is optimized on the basis of the above-mentioned embodiments. In this embodiment, the operation of acquiring, in the search area, a target building according to a defined building selecting rule is optimized to include: finding, in the search area, high-rise buildings; ranking the found high-rise buildings according to height values; and acquiring a high-rise building having a highest height value as the target building. Referring to FIG. 5, the method of this embodiment includes the following steps.

S510, determining a navigation route according to origin position information and destination position information sent by a navigation terminal.

S520, determining a search area corresponding to the origin position information according to the origin position information.

S530, finding, in the search area, high-rise buildings.

In this embodiment, definitions of high-rise buildings in different search areas may be different. For example, when there are many buildings having more than 15 floors in the search area, the high-rise buildings defined at this time may be buildings having more than 20 floors, that is, the navigation server searches the search area for buildings having more than 20 floors. In another example, when there are no buildings above 15 floors in the search area, the high-rise buildings defined at this time may be buildings having more than 10 floors, that is, the navigation server searches the search area for buildings having more than 10 floors.

S540, ranking the found high-rise buildings according to height values.

Illustratively, the navigation server ranks the found high-rise buildings. For instance, the ranking is performed according to distances of the high-rise buildings from the origin position information, or according to the height values of the high-rise buildings. An alternative ranking approach is the ranking performed according to the height values of the high-rise buildings since height differences between the buildings may be directly observed with eyes of the user.

S550, acquiring a high-rise building having a highest height value as the target building.

Illustratively, the high-rise building having the highest height value as the target building according to the above ranking result. At this point, the target building is the highest building in the search area, which helps the user to find the target building accurately.

S560, pushing the navigation route and the target building to the navigation terminal.

According to the method for determining a navigation reference point provided by the fourth embodiment of the present disclosure, a navigation server acquires, in a search area determined by origin position information sent by a navigation terminal, a target building as a reference point indicating a forward direction for a user of the navigation terminal after navigation starts, and provides the target building and a navigation route to the navigation terminal, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

The Fifth Embodiment

Figure 6:
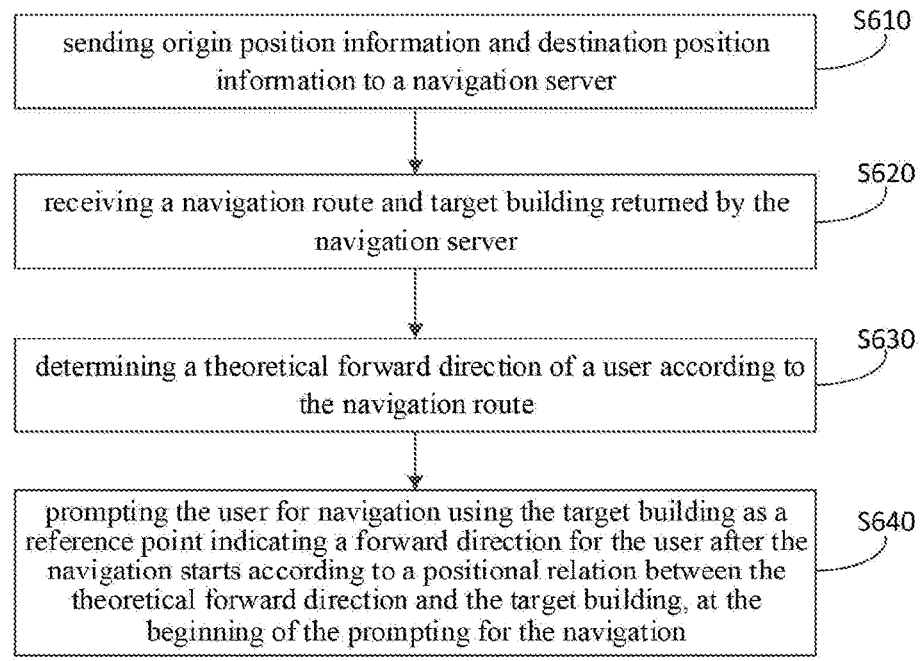
FIG. 6 is a flowchart of a navigation method according to the fifth embodiment of the present disclosure.

FIG. 6 is a flowchart of a navigation method according to the fifth embodiment of the present disclosure. The method of the embodiment may be generally suitable fora situation where a user cannot accurately determine a start direction of a navigation route. The method of this embodiment may be performed by a navigation apparatus, and this apparatus may be implemented by means of software and/or hardware and may be generally integrated into a navigation terminal. Referring to FIG. 6, the navigation method provided by this embodiment includes the following steps.

S610, sending origin position information and destination position information to a navigation server.

S620, receiving a navigation route and target building returned by the navigation server.

S630, determining a theoretical forward direction of a user according to the navigation route.

S640, prompting the user for navigation using the target building as a reference point indicating a forward direction for the user after the navigation starts according to a positional relation between the theoretical forward direction and the target building, at the beginning of the prompting for the navigation.

Illustratively, the positional relation between the target building and the theoretical forward direction of the user confirmed by the navigation terminal may include that the target building is in the theoretical forward direction or the target building is in a direction opposite to the theoretical forward direction. After confirming the positional relation, the navigation terminal may use the target building as the reference point indicating the forward direction after the navigation starts according to the positional relation, and prompt the user for the navigation after the navigation starts.

For instance, after determining the navigation route, the navigation server determines XX building as the target building, and sends the navigation route and name and position information of the XX building to the navigation terminal. After receiving the data, the navigation terminal determines that the XX building is in the direction opposite to the theoretical forward direction of the navigation route. At this point, the navigation terminal may prompt the user to "drive along the direction opposite to that of the XX Building" at the beginning of the navigation. If the XX building is in the theoretical forward direction of the navigation route, the navigation terminal may prompt the user to "drive along the direction of the XX Building" at the beginning of the navigation.

Alternatively, at the beginning of the navigation, the navigation terminal highlights the target building on the navigation map, so that the user recognizes a correct direction according to the highlighted target building.

According to the navigation method provided by the fifth embodiment of the present disclosure, after receiving a navigation route and a target building sent by a navigation server, a navigation terminal prompts the user for navigation using the target building as a reference point indicating a forward direction for a user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

The Sixth Embodiment

Figure 7:
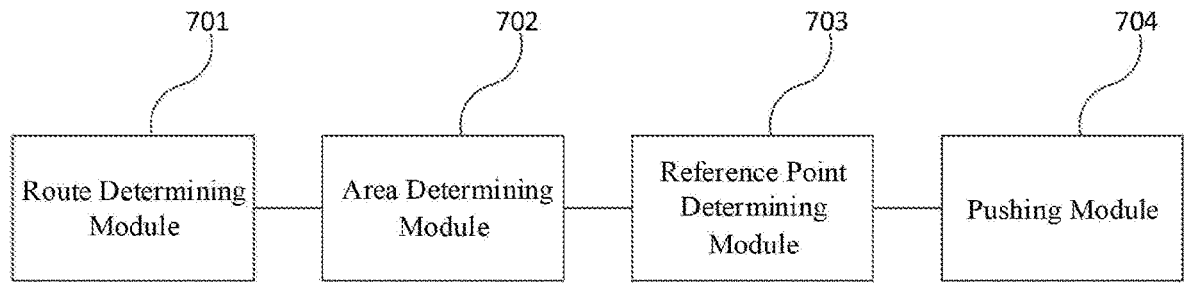
FIG. 7 is a schematic structural diagram of an apparatus for determining a navigation reference point according to the sixth embodiment of the present disclosure.

FIG. 7 is a schematic structural diagram of an apparatus for determining a navigation reference point according to the sixth embodiment of the present disclosure. The apparatus of this embodiment may be generally suitable for a situation where a navigation server confirms a forward direction of a navigation route by selecting a reference point near a position of a navigation origin. Referring to FIG. 7, the apparatus for determining a navigation reference point provided by this embodiment may specifically include:

a route determining module 701, configured to determine a navigation route according to origin position information and destination position information sent by a navigation terminal;

an area determining module 702, configured to determine a search area corresponding to the origin position information according to the origin position information;

a reference point determining module 703, configured to acquire, in the search area, a target building as a reference point indicating a forward direction for a user of the navigation terminal after navigation starts, according to a defined building selecting rule; and a pushing module 704, configured to push the navigation route and the target building to the navigation terminal.

The apparatus for determining a navigation reference point provided by the sixth embodiment of the present disclosure, acquires, in a search area determined by origin position information sent by a navigation terminal, a target building as a reference point indicating a forward direction for a user of the navigation terminal after navigation starts, and provides the target building and a navigation route to the navigation terminal via a navigation server, and after receiving the navigation route and the target building, the navigation terminal prompts the user for the navigation using the target building as the reference point indicating the forward direction for the user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience.

On the basis of the various embodiments, the area determining module 702 may include:

an area position determining unit, configured to determine an area position where the navigation terminal is located according to the origin position information;

a radius determining unit, configured to determine a search radius according to intensity of the area position; and a search area determining unit, configured to determine the search area corresponding to the origin position information according to the origin position information and the search radius.

On the basis of the various embodiments, the reference point determining module 703 may include:

a first generating unit, configured to acquire points of interest (POI) included in the search area to generate a first candidate building set;

a second generating unit, configured to delete POIs having a given name from the first candidate building set to generate a second candidate building set;

a calculating unit, configured to calculate search weights of the POIs in the second candidate building set according to popularity and intensity of the POIs in the second candidate building set; and a target determining unit, configured to use a POI having a highest search weight as the target building.

On the basis of the various embodiments, the calculating unit may be configured to, calculate a search weight w of a POI in the second candidate building set according to a formula: $w = \alpha * P + \beta * I$.

P is the popularity of POI, I is the intensity of POI, and $\alpha$ and $\beta$ are defined ratio coefficients.

On the basis of the various embodiments, the reference point determining module 703 may include:

a high-rise finding unit, configured to find, in the search area, high-rise buildings;

a ranking unit, configured to rank the found high-rise buildings according to height values; and a building confirming unit, configured to acquire a high-rise building having a highest height value as the target building.

On the basis of the various embodiments, the apparatus may further include:

a querying module, configured to query in a building selection library according to the navigation route, where the building selection library stores correlations between navigation routes and buildings;

a first determining module, configured to directly use a building corresponding to the navigation route in the building selection library as the target building if the building selection library includes the navigation route; and a second determining module, configured to perform the operation of acquiring, in the search area, a target building according to a defined building selecting rule, if the building selection library does not include the navigation route.

On the basis of the various embodiments, the apparatus may further include:

a storing module, configured to correspondingly store the navigation route and the target building into the building selection library.

The apparatus for determining a navigation reference point provided by the sixth embodiment of the present disclosure and the method for determining a navigation reference point provided by any embodiment of the present disclosure belong to the same inventive concept. The apparatus may perform the method for determining a navigation reference point provided by any embodiment of the present disclosure, and possess corresponding functional modules for performing the method for determining a navigation reference point and corresponding beneficial effects. For technical details not described in this embodiment, reference may be made to the method for determining a navigation reference point provided by any embodiment of the present disclosure.

The Seventh Embodiment

Figure 8:
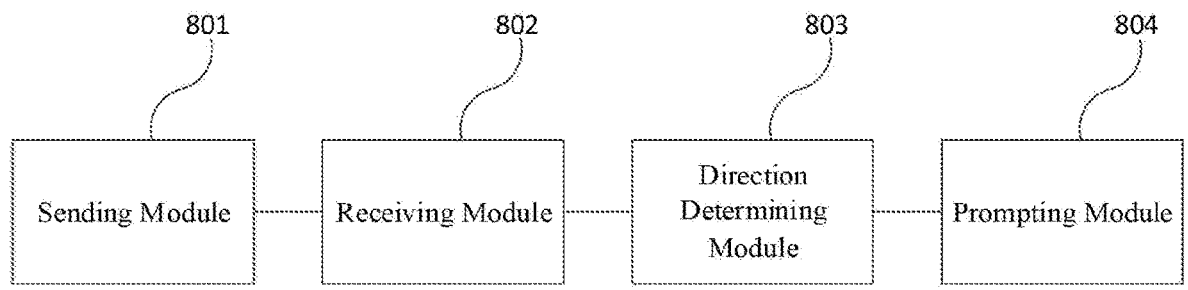
FIG. 8 is a schematic structural diagram of a navigation apparatus according to the seventh embodiment of the present disclosure.

FIG. 8 is a schematic structural diagram of a navigation apparatus according to the seventh embodiment of the present disclosure. The apparatus of this embodiment may be generally suitable for a situation where a user cannot accurately determine a start direction of a navigation route. Referring to FIG. 8, the navigation apparatus provided by this embodiment includes:

a sending module 801, configured to send origin position information and destination position information to a navigation server;

a receiving module 802, configured to receive a navigation route and target building returned by the navigation server;

a direction determining module 803, configured to determine a theoretical forward direction of a user according to the navigation route; and a prompting module 804, configured to prompt the user for navigation using the target building as a reference point indicating a forward direction for the user after the navigation starts according to a positional relation between the theoretical forward direction and the target building, at the beginning of the prompting for the navigation.

According to the navigation apparatus provided by the seventh embodiment of the present disclosure, after receiving a navigation route and a target building sent by a navigation server, a navigation terminal prompts the user for navigation using the target building as a reference point indicating a forward direction for a user after the navigation starts according to a positional relation between a theoretical forward direction determined by the navigation route and the target building, at the beginning of the prompting for the navigation. By this technical means, a problem in the existing navigation technique that users having a poor sense of direction cannot immediately select a correct direction since the users are merely prompted for "start navigation" instead of a clear guidance for a direction in the use scenario of the beginning of the navigation, is solved, and the existing route navigation technique is optimized, thereby achieving a technical effect that a driving direction is clearly indicated for the user at the beginning of the navigation, and improving the user experience The navigation apparatus provided by the seventh embodiment of the present disclosure and the navigation method provided by any embodiment of the present disclosure belong to the same inventive concept. The navigation apparatus may perform the navigation method provided by any embodiment of the present disclosure, and possess corresponding functional modules for performing the navigation method and corresponding beneficial effects. For technical details not described in this embodiment, reference may be made to the navigation method provided by any embodiment of the present disclosure.

The Eighth Embodiment

One or more storage media stores computer executable instructions, and the computer executable instructions, when executed by a computer processor, perform a method for determining a navigation reference point. The method includes:

determining a navigation route according to origin position information and destination position information sent by a navigation terminal;

determining a search area corresponding to the origin position information according to the origin position information;

acquiring, in the search area, a target building as a reference point indicating a forward direction for a user of the navigation terminal after navigation starts, according to a defined building selecting rule; and pushing the navigation route and the target building to the navigation terminal.

When the storage medium perform the method, the determining a search area corresponding to the origin position information according to the origin position information may include:

determining an area position where the navigation terminal is located according to the origin position information;

determining a search radius according to intensity of the area position; and determining the search area corresponding to the origin position information according to the origin position information and the search radius.

When the storage medium perform the method, the acquiring, in the search area, a target building according to a defined building selecting rule may include:

acquiring points of interest (POI) included in the search area to generate a first candidate building set;

deleting POIs having a given name from the first candidate building set to generate a second candidate building set;

calculating search weights of the POIs in the second candidate building set according to popularity and intensity of the POIs in the second candidate building set; and using a POI having a highest search weight as the target building.

When the storage medium perform the method, the calculating search weights of the POIs in the second candidate building set according to popularity and intensity of the POIs in the second candidate building set may include:

calculating a search weight w of a POI in the second candidate building set according to a formula: $w=\alpha*P+\beta*I$, wherein, P is the popularity of the POI, I is intensity of POI, and $\alpha$ and $\beta$ are defined ratio coefficients.

When the storage medium perform the method, the acquiring, in the search area, a target building according to a defined building selecting rule may include:

finding, in the search area, high-rise buildings;

ranking the found high-rise buildings according to height values; and acquiring a high-rise building having a highest height value as the target building.

When the storage medium perform the method, before the acquiring, in the search area, a target building according to a defined building selecting rule, the method may further include:

querying in a building selection library according to the navigation route, where the building selection library stores correlations between navigation routes and buildings;

using directly a building corresponding to the navigation route in the building selection library as the target building, if the building selection library includes the navigation route; and performing the operation of acquiring, in the search area, a target building according to a defined building selecting rule, if the building selection library does not include the navigation route.

When the storage medium perform the method, after the acquiring, in the search area, a target building, the method may further include:

storing correspondingly the navigation route and the target building into the building selection library.

The Ninth Embodiment

One or more storage media stores computer executable instructions, and the computer executable instructions, when executed by a computer processor, perform a navigation method. The method includes:

sending origin position information and destination position information to a navigation server;

receiving a navigation route and target building returned by the navigation server;

determining a theoretical forward direction of a user according to the navigation route; and prompting the user for navigation using the target building as a reference point indicating a forward direction for the user after the navigation starts according to a positional relation between the theoretical forward direction and the target building, at the beginning of the prompting for the navigation.

The Tenth Embodiment

Figure 9:
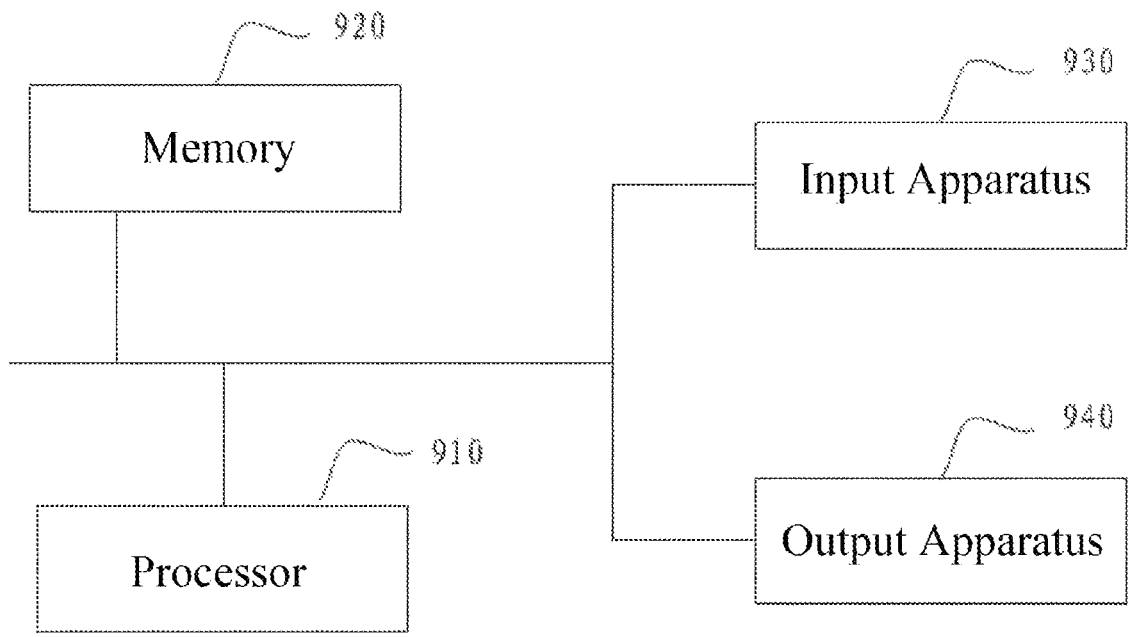
FIG. 9 is a schematic structural diagram of hardware of a device for performing a method for determining a navigation reference point according to the tenth embodiment of the present disclosure.

FIG. 9 is a schematic structural diagram of hardware of a device for performing a method for determining a navigation reference point according to the tenth embodiment of the present disclosure. Referring to FIG. 9, the device includes:

one or more processors 910, as shown in FIG. 9, one processor 910 being taken as an example;

a memory 920; and one or more modules.

The device may further include: an input apparatus 930 and an output apparatus 940. The processors 910, the memory 920, the input apparatus 930 and the output apparatus 940 may be connected via a bus or other manners. FIG. 9 takes the connection via a bus as an example.

As a computer readable storage medium, the memory 920 may be used for storing software programs, computer executable programs and modules, for example, program instructions/modules corresponding to the method for determining a navigation reference point in the embodiments of the present disclosure (for example, the route determining module 701, the area determining module 702, the reference point determining module 703, and the pushing module 704 shown in FIG. 7). The processor 910 runs the software programs, instructions, and modules stored in the memory 920 to execute various functional applications and data processing of a server, so as to implement the method for determining a navigation reference point as discussed in the above method embodiments.

The memory 920 may include a program storage area and a data storage area. The program storage area may store an operating system and an application program for at least one function. The data storage area may store data created according to the use of the terminal apparatus, and so on. In addition, the memory 920 may include a high speed random access memory, and may further include a non-volatile memory, for example, at least one magnetic disk storage device, a flash memory device, or other non-volatile solid-state storage devices. In some embodiments, the memory 920 may further include memories disposed remote to the processors 910. These remote memories may be connected to the terminal apparatus through a network. Examples of the network include, but not limited to, internet, an enterprise intranet, a local area network, a mobile communication network, and a combination thereof.

The input apparatus 930 may be used for receiving input digital or character information, and generating key signal inputs related to user settings of the terminal and functional controls. The output apparatus 940 may include a display screen or other display devices.

The one or more modules are stored in the memory 920, and, when executed by the one or more processors 910, perform the following operations:

determining a navigation route according to origin position information and destination position information sent by a navigation terminal;

determining a search area corresponding to the origin position information according to the origin position information;

acquiring, in the search area, a target building as a reference point indicating a forward direction for a user of the navigation terminal after navigation starts, according to a defined building selecting rule; and pushing the navigation route and the target building to the navigation terminal.

Further, the determining a search area corresponding to the origin position information according to the origin position information includes:

determining an area position where the navigation terminal is located according to the origin position information;

determining a search radius according to intensity of the area position; and determining the search area corresponding to the origin position information according to the origin position information and the search radius.

Further, the acquiring, in the search area, a target building according to a defined building selecting rule includes:

acquiring points of interest (POI) included in the search area to generate a first candidate building set;

deleting POIs having a given name from the first candidate building set to generate a second candidate building set;

calculating search weights of the POIs in the second candidate building set according to popularity and intensity of the POIs in the second candidate building set; and using a POI having a highest search weight as the target building.

Further, the calculating search weights of the POIs in the second candidate building set according to popularity and intensity of the POIs in the second candidate building set includes:

calculating a search weight w of a POI in the second candidate building set according to a formula: $w=\alpha*P+\beta*I$, wherein, P is the popularity of the POI, I is intensity of POI, and $\alpha$ and $\beta$ are defined ratio coefficients.

Further, the acquiring, in the search area, a target building according to a defined building selecting rule includes:

finding, in the search area, high-rise buildings;

ranking the found high-rise buildings according to height values; and acquiring a high-rise building having a highest height value as the target building.

Further, before the acquiring, in the search area, a target building according to a defined building selecting rule, the method may further include:

querying in a building selection library according to the navigation route, where the building selection library stores correlations between navigation routes and buildings;

using directly a building corresponding to the navigation route in the building selection library as the target building, if the building selection library includes the navigation route; and performing the operation of acquiring, in the search area, a target building according to a defined building selecting rule, if the building selection library does not include the navigation route.

Further, after the acquiring, in the search area, a target building, the method may further include:

storing correspondingly the navigation route and the target building into the building selection library.

The Eleventh Embodiment

Figure 10:
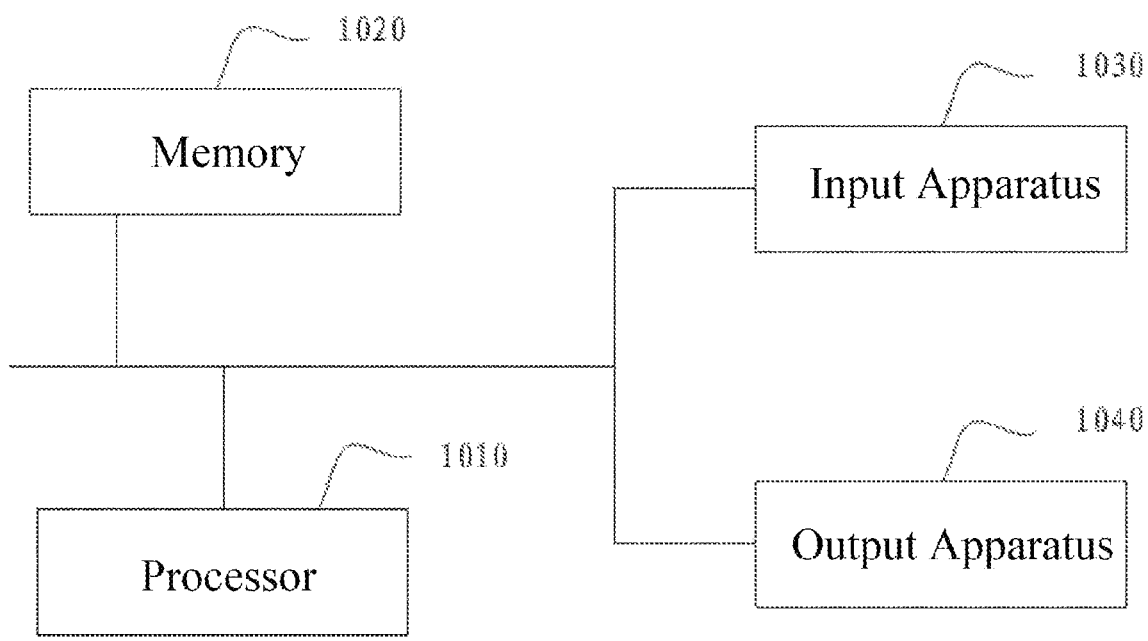
FIG. 10 is a schematic structural diagram of hardware of a device for performing a navigation method according to the eleventh embodiment of the present disclosure.

FIG. 10 is a schematic structural diagram of hardware of a device for performing a navigation method according to the eleventh embodiment of the present disclosure. Referring to FIG. 10, the device includes:

one or more processors 1010, as shown in FIG. 10, one processor 1010 being taken as an example;

a memory 1020; and one or more modules.

The device may further include: an input apparatus 1030 and an output apparatus 1040. The processors 1010, the memory 1020, the input apparatus 1030 and the output apparatus 1040 may be connected via a bus or other manners. FIG. 10 takes the connection via a bus as an example.

As a computer readable storage medium, the memory 1020 may be used for storing software programs, computer executable programs and modules, for example, program instructions/modules corresponding to the navigation method in the embodiments of the present disclosure (for example, the sending module 801, the receiving module 802, the direction determining module 803, and the prompting module 804 shown in FIG. 8). The processor 1010 runs the software programs, instructions, and modules stored in the memory 1020 to execute various functional applications and data processing of a server, so as to implement the navigation method as discussed in the above method embodiment.

The memory 1020 may include a program storage area and a data storage area. The program storage area may store an operating system and an application program for at least one function. The data storage area may store data created according to the use of the terminal apparatus, and so on. In addition, the memory 1020 may include a high speed random access memory, and may further include a non-volatile memory, for example, at least one magnetic disk storage device, a flash memory device, or other non-volatile solid-state storage devices. In some embodiments, the memory 1020 may further include memories disposed remote to the processors 1010. These remote memories may be connected to the terminal apparatus through a network. Examples of the network include, but not limited to, internet, an enterprise intranet, a local area network, a mobile communication network, and a combination thereof.

The input apparatus 1030 may be used for receiving input digital or character information, and generating key signal inputs related to user settings of the terminal and functional controls. The output apparatus 1040 may include a display screen or other display devices.

The one or more modules are stored in the memory 1020, and, when executed by the one or more processors 1010, perform the following operations:

sending origin position information and destination position information to a navigation server;

receiving a navigation route and target building returned by the navigation server;

determining a theoretical forward direction of a user according to the navigation route; and prompting the user for navigation using the target building as a reference point indicating a forward direction for the user after the navigation starts according to a positional relation between the theoretical forward direction and the target building, at the beginning of the prompting for the navigation.

According to the descriptions of the above embodiments, one skilled in the art may clearly understand that the present disclosure may be implemented by means of software and necessary general-purpose hardware, and may be implemented, obviously, by means of hardware. However, the former is a preferred implementation in most cases. Based on such an understanding, the technical solutions of the present disclosure, or the part contributing to the prior art may be essentially embodied in the form of a software product. The computer software product may be stored in a computer readable storage medium, such as a magnetic disk, an optical disk, a read-only memory (ROM), or a random access memory (RAM), and includes several instructions for enabling a computer device (which may be a personal computer, a server, a network device, or the like) to execute the method described in each embodiment of the present disclosure.

It should be noted that, in the above embodiments of the apparatus for determining a navigation reference point and the navigation apparatus, the referred units and modules are merely divided according to a functional logic, but the present disclosure is not limited to the above division manner, as long as the corresponding functions may be achieved. In addition, the specific names of the functional units are merely used for distinguishing, and are not intended to limit the scope of the present disclosure.

The above descriptions are merely specific embodiments of the present disclosure, and the scope of the present disclosure is not limited thereto. Any changes or replacements that can be easily conceived of by one skilled in the art within the technical scope disclosed by the present disclosure should be covered by the scope of the present disclosure. Therefore, the scope of the present disclosure should be interpreted as the scope sought to be protected by the claims.

What is claimed is:

1. A method for determining a navigation reference point, comprising:
   determining a navigation route according to origin position information and destination position information sent by a navigation terminal;
   determining a search area corresponding to the origin position information according to the origin position information, comprising: determining an area position where the navigation terminal is located according to the origin position information; determining a search radius according to intensity of the area position; and determining the search area corresponding to the origin position information according to the origin position information and the search radius;
   acquiring, in the search area, a target building as a reference point indicating a forward direction for a user of the navigation terminal after navigation starts, according to a defined building selecting rule; and
   pushing the navigation route and the target building to the navigation terminal.

2. The method according to claim 1, wherein the acquiring, in the search area, a target building according to a defined building selecting rule comprises:
   acquiring points of interest (POI) included in the search area to generate a first candidate building set;
   deleting POIs having a given name from the first candidate building set to generate a second candidate building set;
   calculating search weights of the POIs in the second candidate building set according to popularity and intensity of the POIs in the second candidate building set; and
   using a POI having a highest search weight as the target building.

3. The method according to claim 2, wherein the calculating search weights of the POIs in the second candidate building set according to popularity and intensity of the POIs in the second candidate building set comprises:
   calculating a search weight w of a POI in the second candidate building set according to a formula: $w=\alpha*P+\beta*I$,
   wherein, P is the popularity of the POI, I is the intensity of the POI, and $\alpha$ and $\beta$ are defined ratio coefficients.

4. The method according to claim 1, wherein the acquiring, in the search area, a target building according to a defined building selecting rule comprises:
   finding, in the search area, high-rise buildings;
   ranking the found high-rise buildings according to height values; and
   acquiring a high-rise building having a highest height value as the target building.

5. The method according to claim 2, wherein before the acquiring, in the search area, a target building according to a defined building selecting rule, the method further comprises:
   querying in a building selection library according to the navigation route, wherein the building selection library stores correlations between navigation routes and buildings;
   using directly a building corresponding to the navigation route in the building selection library as the target building, if the building selection library includes the navigation route; and
   performing the operation of acquiring, in the search area, a target building according to a defined building selecting rule, if the building selection library does not include the navigation route.

6. The method according to claim 5, wherein after the acquiring, in the search area, a target building, the method further comprises:
   storing correspondingly the navigation route and the target building into the building selection library.

7. A navigation method, comprising:
   sending origin position information and destination position information to a navigation server;
   receiving a navigation route and target building returned by the navigation server; the target building being determined by: determining a search area corresponding to the origin position information according to the origin position information, comprising: determining an area position where a navigation terminal is located according to the origin position information, determining a search radius according to intensity of the area position, and determining the search area corresponding to the origin position information according to the origin position information and the search radius; and acquiring, in the search area, the target building;
   determining a theoretical forward direction of a user according to the navigation route; and
   prompting the user for navigation using the target building as a reference point indicating a forward direction for the user after the navigation starts according to a positional relation between the theoretical forward direction and the target building, at the beginning of the prompting for the navigation.

8. An apparatus for determining a navigation reference point, comprising:
   at least one processor; and
   a memory storing instructions, the instructions when executed by the at least one processor, cause the at least one processor to perform operations, the operations comprising:
   determining a navigation route according to origin position information and destination position information sent by a navigation terminal;
   determining a search area corresponding to the origin position information according to the origin position information, comprising: determining an area position where the navigation terminal is located according to the origin position information; determining a search radius according to intensity of the area position; and determining the search area corresponding to the origin position information according to the origin position information and the search radius;
   acquiring, in the search area, a target building as a reference point indicating a forward direction for a user of the navigation terminal after navigation starts, according to a defined building selecting rule; and pushing the navigation route and the target building to the navigation terminal.

9. The apparatus according to claim 8, wherein the acquiring, in the search area, a target building according to a defined building selecting rule comprises:
   acquiring points of interest (POI) included in the search area to generate a first candidate building set;
   deleting POIs having a given name from the first candidate building set to generate a second candidate building set;
   calculating search weights of the POIs in the second candidate building set according to popularity and intensity of the POIs in the second candidate building set; and
   using a POI having a highest search weight as the target building.

10. The apparatus according to claim 9, wherein the calculating search weights of the POIs in the second candidate building set according to popularity and intensity of the POIs in the second candidate building set comprises,
   calculating a search weight w of a POI in the second candidate building set according to a formula: $w=\alpha*P+\beta*I$,
   wherein, P is the popularity of the POI, I is the intensity of the POI, and $\alpha$ and $\beta$ are defined ratio coefficients.

11. The apparatus according to claim 8, wherein the acquiring, in the search area, a target building according to a defined building selecting rule comprises:
   finding, in the search area, high-rise buildings;
   ranking the found high-rise buildings according to height values; and
   acquiring a high-rise building having a highest height value as the target building.

12. The apparatus according to claim 9, wherein before the acquiring, in the search area, a target building according to a defined building selecting rule, the operations further comprise:
   querying in a building selection library according to the navigation route, wherein the building selection library stores correlations between navigation routes and buildings;
   using directly a building corresponding to the navigation route in the building selection library as the target building if the building selection library includes the navigation route; and
   performing the operation of acquiring, in the search area, a target building according to a defined building selecting rule, if the building selection library does not include the navigation route.

13. The apparatus according to claim 11, wherein before the acquiring, in the search area, a target building according to a defined building selecting rule, the operations further comprise:
   querying in a building selection library according to the navigation route, wherein the building selection library stores correlations between navigation routes and buildings;
   using directly a building corresponding to the navigation route in the building selection library as the target building if the building selection library includes the navigation route; and
   performing the operation of acquiring, in the search area, a target building according to a defined building selecting rule, if the building selection library does not include the navigation route.

14. The apparatus according to claim 12, wherein after the acquiring, in the search area, a target building, the operations further comprise:
   storing correspondingly the navigation route and the target building into the building selection library.

15. The apparatus according to claim 13, wherein after the acquiring, in the search area, a target building, the operations further comprise:
   storing correspondingly the navigation route and the target building into the building selection library.

16. A navigation apparatus, comprising:
   at least one processor; and
   a memory storing instructions, the instructions when executed by the at least one processor, cause the at least one processor to perform the method according to claim 7.

17. A non-transitory computer storage medium storing a computer program, the computer program when executed by one or more processors, causes the one or more processors to perform the method according to claim 1.

18. A non-transitory computer storage medium storing a computer program, the computer program when executed by one or more processors, causes the one or more processors to perform the method according to claim 7.

* * * * *